(12) United States Patent
Holcomb

(10) Patent No.: US 12,170,573 B2
(45) Date of Patent: Dec. 17, 2024

(54) SENSOR MEASUREMENT TIMESTAMP DIFFERENCES

(71) Applicant: Cisco Technology, Inc., San Jose, CA (US)

(72) Inventor: Kevin William Holcomb, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/959,504

(22) Filed: Oct. 4, 2022

(65) Prior Publication Data

US 2024/0113813 A1    Apr. 4, 2024

(51) Int. Cl.
*H04L 1/18* (2023.01)
*H04L 1/1607* (2023.01)
*H04L 1/1806* (2023.01)
*H04L 67/12* (2022.01)

(52) U.S. Cl.
CPC .......... *H04L 1/1806* (2013.01); *H04L 1/1678* (2013.01); *H04L 67/12* (2013.01)

(58) Field of Classification Search
CPC ...... H04L 1/1806; H04L 1/1678; H04L 67/12
See application file for complete search history.

(56) References Cited

U.S. PATENT DOCUMENTS

| | | | | |
|---|---|---|---|---|
| 9,197,686 | B1* | 11/2015 | Kirkby | ............ H04L 47/2433 |
| 9,553,910 | B2* | 1/2017 | Kirkby | ............ H04L 65/762 |
| 9,686,051 | B2 | 6/2017 | Distasi et al. | |
| 10,965,569 | B2 | 3/2021 | Ameling et al. | |
| 11,202,228 | B2 | 12/2021 | Bartfai-Walcott et al. | |
| 11,776,342 | B1* | 10/2023 | Farah | ............ G07C 9/10 |
| | | | | 235/380 |
| 2014/0257730 | A1* | 9/2014 | Czompo | ............ G01P 15/08 |
| | | | | 702/89 |
| 2016/0080450 | A1* | 3/2016 | Kirkby | ............ H04L 47/193 |
| | | | | 709/219 |
| 2018/0295548 | A1* | 10/2018 | Kumar | ............ H04W 36/0083 |
| 2020/0015043 | A1 | 1/2020 | Patil et al. | |

(Continued)

OTHER PUBLICATIONS

"GPS Tracker Payload Formats and Data Visualization", online: https://docs.miromico.ch/tracker/dev/payload.html, accessed May 17, 2022, 10 pages.

(Continued)

*Primary Examiner* — Samir W Rizk
(74) *Attorney, Agent, or Firm* — BEHMKE INNOVATION GROUP LLC; James M. Behmke; James J. Wong

(57) ABSTRACT

In one embodiment, a device may transmit, via a network to an application, a series of sensor measurements captured by the device, each sensor measurement having an associated timestamp based on a clock of the device. The device may receive, from the application, an indication that at least a portion of the series of sensor measurement were not received by the application. The device may determine, for those sensor measurements not received by the application, timestamp differences between their timestamps and a current time of the clock of the apparatus, after receiving the indication. The device may resend the portion of the series of sensor measurements to the application and their timestamp differences.

19 Claims, 8 Drawing Sheets

(56) References Cited

U.S. PATENT DOCUMENTS

2020/0205062 A1    6/2020   Azizi et al.
2023/0093492 A1*  3/2023   Bönig .................... H04W 4/70
                                                      370/328

OTHER PUBLICATIONS

"Advantech AE Technical Share Document", SR# 1-4192645288, Jun. 2020, 6 pages.
Olson, Edwin, "A Passive Solution to the Sensor Synchronization Problem", 2010 IEEE/RSJ International Conference on Intelligent Robots and Systems, Oct. 2010, 6 pages, IEEE.

* cited by examiner

SENSOR MEASUREMENT TIMESTAMP DIFFERENCES

TECHNICAL FIELD

The present disclosure relates generally to computer networks, and, more particularly, to sensor measurement timestamp differences.

BACKGROUND

Today, sensors are being increasingly deployed across a wide variety of environments. For instance, various types of sensors (e.g., temperatures sensors, motion sensors, etc.) are often found in homes, corporate offices, industrial facilities, and the like. In turn, their resulting measurements are utilized for a variety of purposes, such as inputs to automated systems that monitor, manage, or otherwise control systems in the environment.

Many modern sensors have constrained resources in terms of both their computational abilities, as well as their power sources (e.g., an on-board battery). As such, the sensor measurements may be periodically offloaded from a sensor to another device or application for processing. For a variety of reasons, a sensor may not be able to send its measurements contemporaneous with their collection. In such instances, an indication as to the time at which the sensor measurement was collected may provide useful context for the sensor measurement. However, equipping a sensor with the capability to provide accurate timestamps that are synchronized using a network time synchronization protocol would also consume additional resources of the sensor (e.g., power consumption, computational burden, bandwidth consumption, etc.), which are already constrained.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
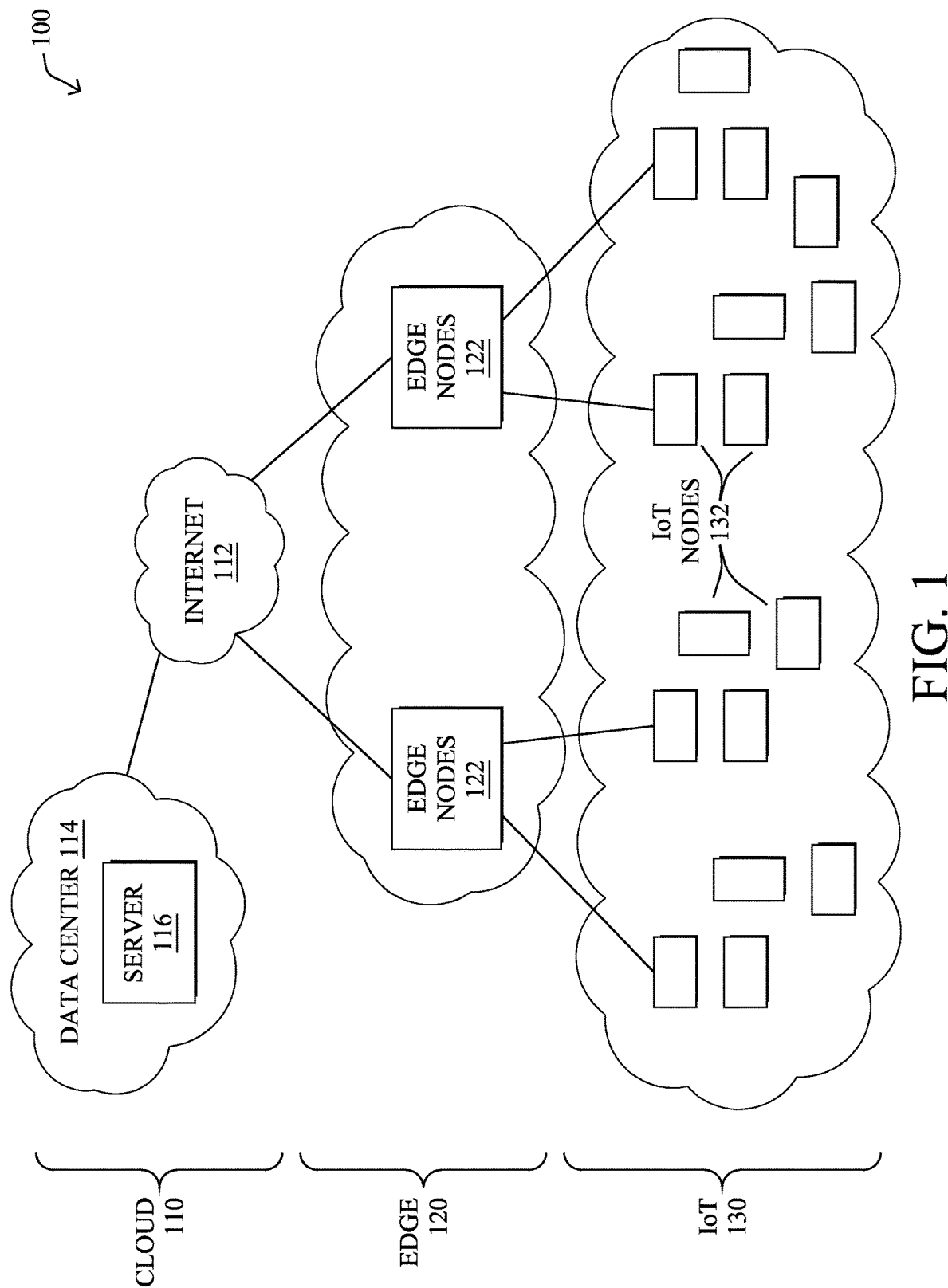
FIG. 1 illustrates an example computer network.

According to one or more embodiments of the disclosure, a device may transmit, via a network to an application, a series of sensor measurements captured by the device, each sensor measurement having an associated timestamp based on a clock of the device. The device may receive, from the application, an indication that at least a portion of the series of sensor measurement were not received by the application. The device may determine, for those sensor measurements not received by the application, timestamp differences between their timestamps and a current time of the clock of the apparatus, after receiving the indication. The device may resend the portion of the series of sensor measurements to the application and their timestamp differences.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to edge endpoints to provide computing, storage, and networking resources and services. Multiple edge nodes organized or configured together form an edge system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, edge 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the edge layer 120, various edge nodes/devices 122 (e.g., with edge modules, described below) may execute various edge computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
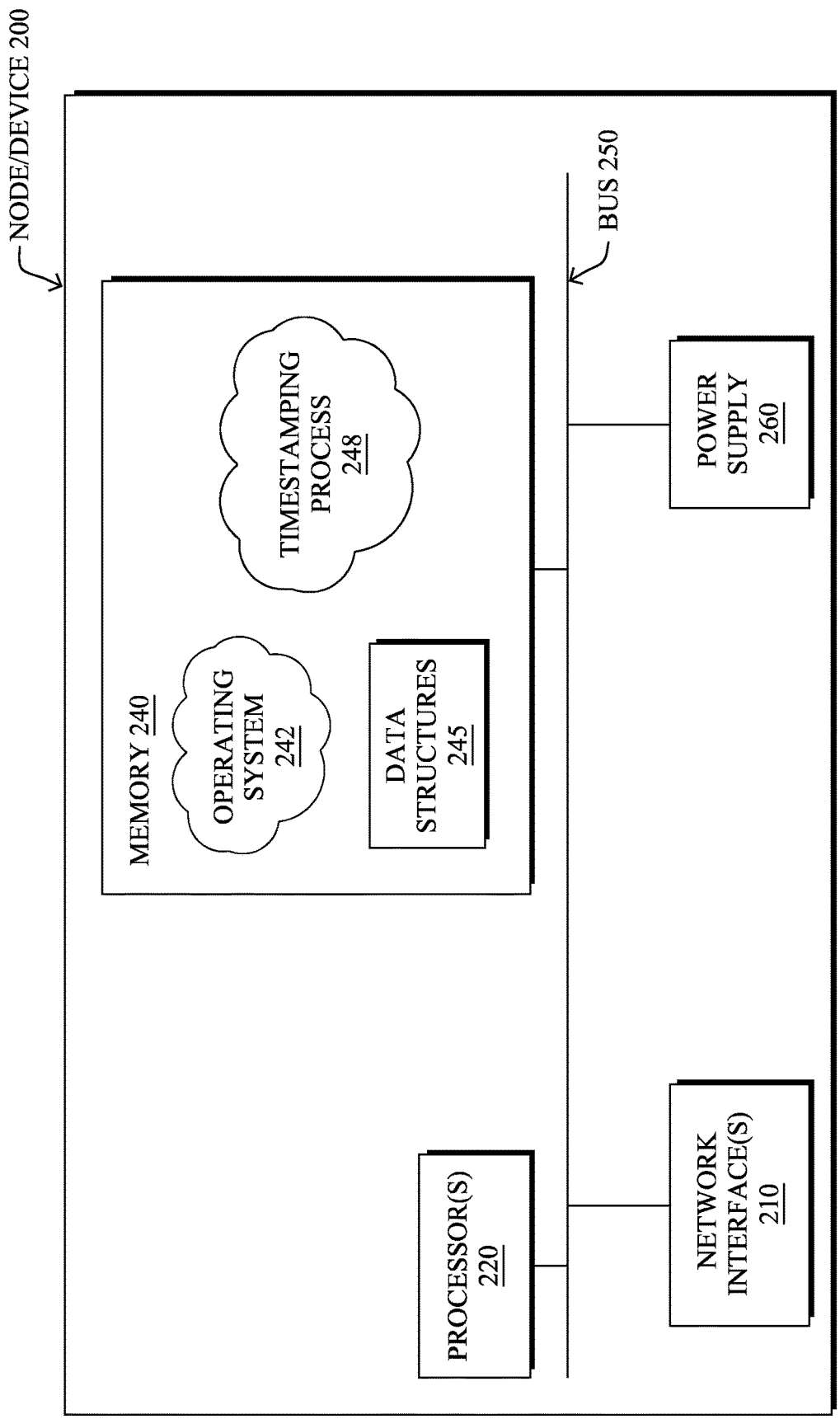
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may include a timestamping process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Timestamping process 248 includes computer executable instructions that, when executed by processor(s) 220, cause device 200 to perform timestamping of sensor measurements. In various embodiments, the sensor measurements subject to timestamping process may be captured by a sensor component of device 200.

As noted above, sensor measurements may be uploaded across a data network to another device for processing and/or further use. As such, the sensors that are capturing the data may preserve useful characteristics such as low cost, low processing demands, low power consumption, small form factor, etc. by relying on a different device or application to perform the more computationally demanding, more power consuming and/or more costly functionalities.

However, in some cases, a sensor's ability to communicate with other devices and/or applications across a data network may be interrupted. As such, a sensor may not always be able to send its measurements contemporaneous with their collection. Therefore, a time delay may occur between the time at which the sensor measurement is collected and the time at which the sensor measurement is sent over the network for processing.

For example, when there is a power/network outage or when a sensor moves outside of the range of LoRaWAN network coverage, the sensor may buffer its sensor to preserve it until a connection with the data network is restored. By way of example, a food processing company may have data network coverage for its sensors to report their sensor measurements at "Site A" and at "Site B," but no coverage in the area between "Site A" and "Site B." So, if a user of a sensor wants traceability of the temperature of the food while in transit from "Site A" to "Site B," then the temperature sensor may buffer its measurements taken while in transit between the two sites. Likewise, if the power or network goes out at a remote site, data may be buffered within the sensor.

Buffering sensor measurements represents one potential mechanism to preserve them until they can be reported, but is still limited by the memory capacity of the sensor. However, in many instances, the context of when the sensor measurement was taken can be equally important as the sensor measurement itself. For example, if a sensor finds itself back in network coverage at 3:00 PM and starts transmitting buffered messages collected throughout the day, it may appear that all of the measurements were collected at 3:00 PM. In such an instance, no appreciation of the temporal relationship of sensor measurement may be gained by the receiving device or application.

Timestamps may be associated to sensor measurements to provide their temporal contexts to their receiver. However, the computationally-limited and/or power-limited characteristics of many sensors and/or bandwidth limitation of the data networks over which they communicate may practically prohibit the addition of hardware and/or software dedicated to tracking time to provide accurate timestamps to sensor measurements that cannot be immediately sent.

As would be appreciated, most sensors are not equipped with hardware and/or software that allows the sensor to track absolute time. For instance, a sensor may lack GPS connectivity which can derive time via GPS. In another example, a sensor may not have a real time clock (RTC) from which time can be derived. Furthermore, downlinks in LoRaWAN are very costly from a spectrum perspective and may be limited by duty cycle requirements such that periodically providing the sensor the time via downlink is also costly.

As a result, sensor designers often find themselves stuck deciding between adding additional expensive components (e.g., adding GPS, adding a real-time clock, etc.) and/or consuming more of limited resources (e.g., bandwidth, computational capacity, duty cycle, power, etc.) at the sensor or producing sensor measurements that lack the context of when they were collected. Currently, there are no existing mechanism available to provide accurate timestamping for buffered sensor measurements without requiring GPS, without periodically syncing time via downlinks, and/or without requiring an RTC addition to a sensor.

Sensor Measurement Timestamp Differences

The techniques herein introduce herein introduce mechanisms to provide accurate timestamping to sensor measurements in devices that do not include or utilize a mechanism for telling time. For example, the techniques introduced herein may provide a mechanism to determine a time when a sensor measurement that was buffered and sent at a later time was actually collected. The techniques may utilize mechanisms that provide this functionality while minimizing additional hardware requirements and downlink messages. For example, the techniques may provide accurate timestamping for buffered sensor measurements without requiring GPS, without periodically syncing time via downlinks, and/or without requiring an RTC addition to a sensor.

Specifically, and according to one or more embodiments of the disclosure as described in detail below, a device may transmit, via a network to an application, a series of sensor measurements captured by the device, each sensor measurement having an associated timestamp based on a clock of the device. The device may receive, from the application, an indication that at least a portion of the series of sensor measurement were not received by the application. The device may determine, for those sensor measurements not received by the application, timestamp differences between their timestamps and a current time of the clock of the device, after receiving the indication. The device may resend the portion of the series of sensor measurements to the application and their timestamp differences.

Illustratively, the techniques described herein may be performed by hardware, software, and/or firmware, such as in accordance with the timestamping process 248, which may include computer executable instructions executed by the processor 220 (or independent processor of interfaces 210) to perform functions relating to the techniques described herein, e.g., in conjunction with routing process 244.

Operationally, FIG. 3A-3D illustrate an example of a timestamping process 300, in accordance with one or more embodiments described herein. The process 300 may be performed between a device 302, such as a sensor, and an application 304, which is typically executed by another device or server that is remote to that of the device 302. More specifically, device 302 may a computing device and may comprise and/or be communicatively coupled to a sensor. For example, device 302 may comprise and/or be communicatively coupled to one or more LoRaWAN sensors configured to collect sensor measurements.

In various embodiments, device 302 may not have a mechanism that provides a concept of a standardized time value at device 302. For example, device 302 may not have access to an indication of a time value that is synchronized to a time standard (e.g., time synchronized according to a network standard, absolute time, standard time, a manner of telling time that is shared with other devices via synchronization to a standard, a geographically defined time standard, a meridian-based time standard, synchronized to a 24-hour clock time standard, synchronized to a calendar time standard, etc.). However, device 302 may have access to an integrated and/or communicatively coupled clock. The clock may include a mechanism by which to measure time and/or its passage unrelated to the time in, for example, a time zone or other time standard.

For example, a clock of a device 302 may be conceptualized as more of a stopwatch than a clock, where the stopwatch may be based on any periodic occurrence at device 302. That is, the clock may not be synchronized to any time standard, but rather may be a free-running clock. A free-running clock may be a clock that utilizes a periodic signal which may be utilized as a benchmark for the passage of time without being tied direct to a synchronized time standard. For example, one "tick" of a free running clock may occur every one microsecond or some other unit of time.

Examples of such clocks as may be included in device 302 may include a system clock, a circuit, a vibrational frequency of a component, a chip, a signal, a pulse, a counter, etc. Device 302 may use these clocks for other purposes than those described below. For example, device 302 may otherwise utilize such clocks to know when to open communication windows, when to sample data on predefined intervals, for duty compliance cycle, etc. The free-running clock may not be a real-time clock (RTC). Instead, a free-running clock may be a clock that is utilized and/or intended for other purposes within device 302 that do not involve a synchronized time standard.

Application 304 may include a computing application including instructions executable by a processing resource to perform various functionalities. For example, application 304 may receive, process, aggregate, store, communicate, and/or transform sensor measurements. Application 304 may utilize the sensor measurements to manage and/or perform tasks such as device management, building management, data display, inventory management, automation, health monitoring, environmental monitoring, industrial process management, supply chain management, etc. In short, application 304 may include the machine-readable instructions executable to do something with the sensor measurements.

Application 304 may reside on and/or be executed by a computing device that is separate from device 302. Device 302 and application 304 may be communicatively coupled with one another across a data communication network. The data communication network may be a wide area network (WAN) such as low-power wide-area network (LPWAN) which may be a LoRaWAN network. Device 302 and application 304 communicate with each other via data transmissions made across the data communication network.

In timestamping process 300, device 302 may capture sensor measurements. The sensor measurements may be captured by one or more sensors of device 302. As the sensor measurements are collected by device 302, they may be buffered at device 302. For example, the device 302 may include buffer memory configured to store an amount of past sensor measurements collected by one or more sensors of device 302. The amount of past sensor measurements that can be stored may be as many sensor measurements as are feasible to store in the buffer memory given any buffer memory size constraints.

Device 302 may determine a time-of-collection timestamp value for each sensor measurement that it collects. The time-of-collection timestamp value may include an indication of a time value (e.g., unrelated and/or unsynchronized to a standardized time) indicated by a free-running clock of device 302 when the sensor measurement was collected by the device 302.

Device 302 may associate the time-of-collection timestamp value to that sensor measurement. For example, device 302 may store a record of the time-of-collection timestamp value of the sensor measurement with the sensor measurement itself in the buffer. In this manner, device 302 may store a number of past sensor measurements and their associated time-of-collection timestamp value indicating when they were collected. That is, device 302 may populate its buffer with a record of prior sensor measurements and their corresponding time-of-collection timestamp value indicative of when they were collected divorced from a standardized time value.

Figure 3A:
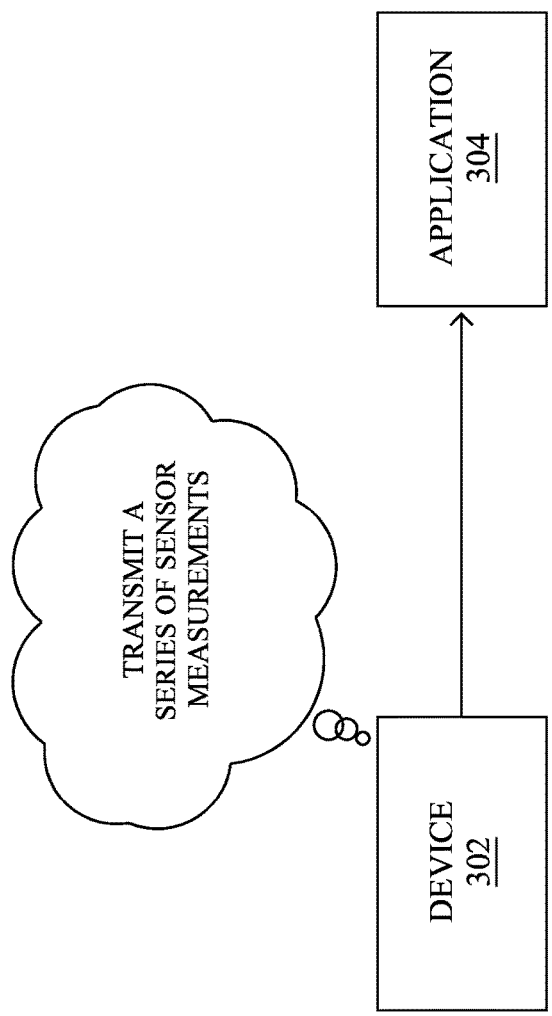
FIGS. 3A-3D illustrate examples of a timestamping process.

As illustrated in FIG. 3A, device 302 may continuously and/or periodically transmit sensor measurements that it has collected, stored, and/or time-of-collection timestamped to application 304. Device 302 may send the sensor measurements as they are collected, buffered, and/or timestamped and/or it may send the sensor measurements in batches. Regardless of the periodicity and/or relative timing of their sending, device 302 may transmit a series of sensor measurements to application 304. Device 302 may transmit the series of sensor measurements to application 304 regardless of whether device 302 is actively coupled to the data network (e.g., within range of the data network), whether application 304 is actively coupled to and/or receiving messages across the data network, whether the data network is operational, whether an acknowledgment of receipt of the sensor measurement is received from application 304, etc. That is, initially device 302 may blindly transmit sensor measurements to application 304 according to its own schedule and without knowledge or confirmation of whether application 304 is receiving the measurements it is sending.

Each transmission of sensor measurements from device 302 to application 304 may include the time-of-collection timestamp value for the sensor measurements being transmitted. For example, each sensor measurements may be transmitted as a unit of data such as a frame. Each unit of data may include the sensor measurement and its associated time-of-collection timestamp. Although, in some examples, the time-of-collection timestamp value for the sensor measurements may be saved in the buffer but not sent in the frame. In such instances, application 304 may, if they receive the sensor measurement in its initial transmission, determine a standardized time-of-collection timestamp value for the sensor measurement from the applications clock at the time it receives the sensor measurement.

In addition, each transmission of sensor measurements from device 302 to application 304 may include a count value associated with the sensor measurements. The count value may include an alphanumeric identifier of the data frame that can be used to identify the frame and/or its relative order in a series of data frames. For example, each data frame transmitted from device 302 to application 304 may include and/or be transmitted with a sensor measurement, the sensor measurement's associated time-of-collection timestamp, and/or a frame count value identifying that particular data frame. In various embodiments, the data frame may be a LoRaWAN frame which includes an original LoRaWAN frame count of the frame. Device 302 may store the count value of the frame carrying the sensor measurement in the buffer with the sensor measurement.

As previously described, device 302 may transmit a series of sensor measurements (e.g., comprising the sensor measurements, a time-of-collection timestamp, a count value, etc.) to application 304. In various embodiments, application 304 may include a mechanism that provides a concept of a standardized time value (e.g., a date value, a time value, an hour value, a minute value, a second value, etc. tied to a standard or synchronized time). For example, application 304 may have access to an indication of a time value that is synchronized to a time standard (e.g., time synchronized according to a network standard, absolute time, standard time, a manner of telling time that is shared with other devices via synchronization to a standard, a geographically defined time standard, a meridian-based time standard, synchronized to a 24-hour clock time standard, synchronized to a calendar time standard, etc.). For instance, application 304 may include time-keeping hardware (e.g., a real-time clock (RTC), etc.) and/or software and/or be configured to derive a time value by syncing via a network time protocol (NTP) or some other time-sync protocol, which the free-running time source of device 302 does not utilize.

Application 304 may utilize these indications of time values (e.g., synchronized to a time standard) to determine a standardized time when it receives a communication from device 302. For example, application 304 may reference an indication of a current time value (e.g., synchronized to a time standard) at receipt of a sensor measurement from device 302 in order to determine a time value (e.g., synchronized to the standardized time value) when that sensor measurement was received from device 302. This time value may be utilized as a time-of-receipt timestamp for the received sensor measurement. Application 304 associate the time-of-receipt timestamp to the sensor measurement.

However, application 304 may not receive every sensor measurement sent from device 302 every single time. For example, data network outages, power outages, communication errors, being out of range of the data network, etc. may prevent a portion of the sensor measurements being sent from device 302 from arriving at application 304. As previously described, device 302 is not initially aware of whether application 304 received the sensor measurements that it initially sent because those sensor measurements are sent without regard to any acknowledgement of receipt by application 304. Of course, if the sensor measurement initially sent from device 302 never reached application 304, application 304 may not realize that the sensor measurements were ever sent and/or that it did not receive them based solely on the failure to receive those communications.

Periodically, device 302 may query application 304 regarding which of the series of sensor measurements that device 302 previously sent have been received by application 304. For example, device 302 may query application 304 once every X number of sensor measurement transmissions to application 304 (e.g., once every one hundred uplinks of sensor measurements). The query may be submitted as part of a data frame carrying a sensor measurement payload. For example, device 302 may cause a flag to be added to a payload including a sensor measurement. To simplify, the flag may be conceptualized as a communication to application 304 of the message "Hello application, have you received all messages from me?"

Application 304 may determine whether it has received all the messages based on a count value specified in the query and/or a count value of the frame to which the query flag was added. For example, application 304 may analyze a frame count included in the frame containing the query and recognize that it has a frame count of one hundred. However, application 304 may determine that the last sensor measurement transmission successfully received from device 302 had a frame count of forty-four. Since the count values may follow a sequence, application 305 may determine, based on where the last received count value was in the sequence versus where the currently received count value is in the sequence, which count values it is missing. For example, where the currently received frame count is one hundred and the previously received from count was forty-four, application 304 may determine that it missed transmitted frames spanning count value forty-five to count value ninety-nine.

Application 304 may respond the query. For example, application 304 may communicate which of the count values, and therefore the missing sensor measurements by association therewith. For example, application 304 may communicate over the network (e.g., via a LoRaWAN network server) a resend request message. The resend request message may be conceptualized as a communication to device 302 of the message "I am missing count values forty-five to ninety-nine; please resend." Of course, if application 304 and/or device 302 are not communicatively coupled when the initial query communication occurs (e.g., there is no data network coverage), then application 304 will not receive the frame with the query and/or will not return a response to the query.

Alternatively, if application 304 receives the frame count with the query and determines that it has received all the frames (e.g., has previously received frames with count values one through one hundred), then application 304 may respond with an acknowledgement of receipt of all the frames (e.g., conceptualized as a communication to device 302 of the message "Yes, I have everything"). In such a case, device 302 may now have an acknowledgment that prior sensor measurements sent to application 304 were, in fact, received by application 304.

As described above, device 302 may buffer historical sensor measurements after collecting and/or transmitting them. However, once device 302 has received acknowledgement that application 304 received the frames containing those sensor measurements (e.g., identified by their count value), then device 302 may remove those measurements from the buffer to free up space for buffering additional measurements. For example, where device 302 buffered sensor measurements one through one hundred, which were transmitted to application 304 in frames with corresponding count values of one through one hundred, it may delete those sensor measurements from the buffer in response to receiving the acknowledgement from application 304 that it received all the data frames with count values of one through one hundred.

Figure 3B:
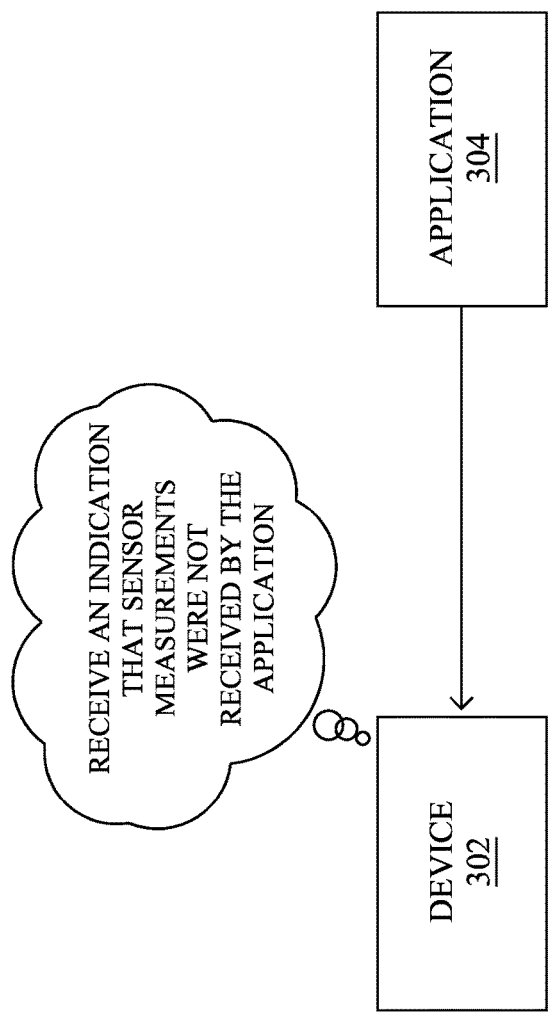

As illustrated in FIG. 3B, device 302 may receive an indication from application 304 that a portion of the sensor measurements sent by device 302 were not received by application 304. As outlined above, the indication may be a response (e.g., a resend request) of application 304 to a query inserted in a data frame sent from device 302 to application 304. The indication may specify which sensor measurements were not received by application 304. For example, the indication may specify count values of frames not received by application 304. As such, device 302 may identify which sensor measurements were not received by application 304 by identifying the sensor measurement that was sent in the frame with the count value indicated as not received by application 304. In some examples, the count value of the frame by which a particular sensor measurement was transmitted may be associated to and/or saved with the corresponding sensor measurement in the buffer. Device 302 may retrieve the identified sensor measurements and/or their time-of-collection timestamps from the buffer for resending.

Figure 3C:
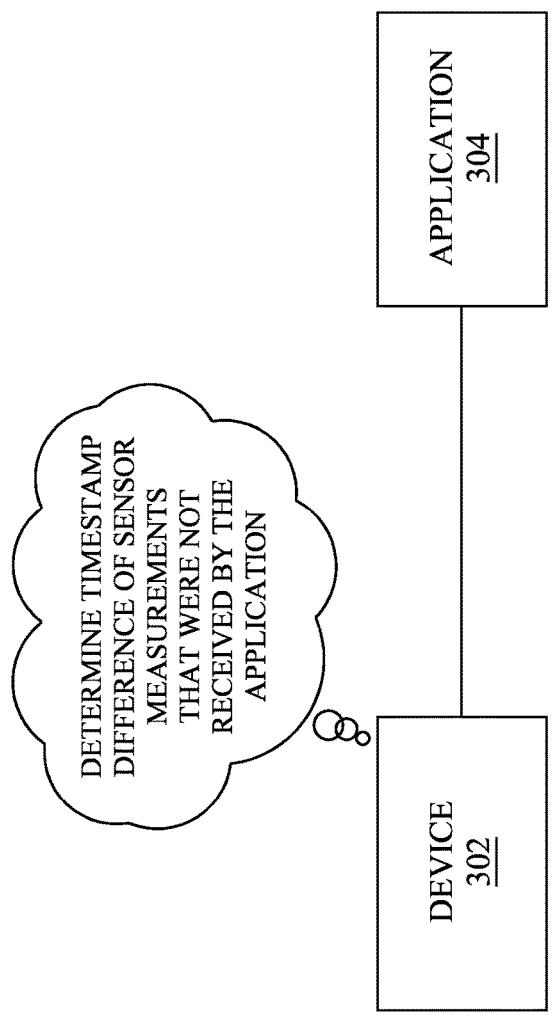

As illustrated in FIG. 3C, in response to receiving the resend request and/or identifying the sensor measurements that were transmitted to but not received by application 304, device 302 may determine a timestamp difference of each the un-received sensor measurements. The timestamp difference of each sensor measurement may be determined utilizing the time-of-collection timestamp associated to and/or buffered with that sensor measurement and a current indication of a time value (e.g., unrelated and/or unsynchronized to a standardized time) of the free-running clock of device 302. The current indication may be the time value indicated by the free-running clock of the device 302 at the time that the device 302 is determining the timestamp difference and/or at the time that the device 302 will resend the sensor measurement for which the timestamp difference is being determined.

In various embodiments, the timestamp difference of a sensor measurement may be calculated as the difference between its time-of-collection timestamp and the currently indicated time value indicated by the free-running clock of the device 302. For example, by subtracting the time-of-collection timestamp (e.g., retrieved from the buffer) for a sensor measurement from the currently indicated time value indicated by the free-running clock of the device 302, a timestamp difference for that sensor measurement may be determined and/or associated to that sensor measurement. As with each of the time-of-collection timestamps for a sensor measurements and the currently indicated time value indicated by the free-running clock of the device 302, the time stamp difference may not be synchronized to a time standard but may be a time difference that is relative to the time indications of the free-running clock of device 302. The timestamp difference may be determined to be seconds, minutes, hours, days, pulses, and/or any other metric of time passage that has lapsed from the time-of-collection and the currently indicated time value according to a free-running and/or unsynchronized time source of device 302. Again, the time source of device 302 may not be synchronized to a time standard nor to a time source used by application 304 for timestamping. Likewise, the timestamp difference is not synchronized to a time standard nor to a time source used by application 304 for timestamping. Device 302 may associate the determined timestamp difference for a sensor measurement to the sensor measurement.

Figure 3D:
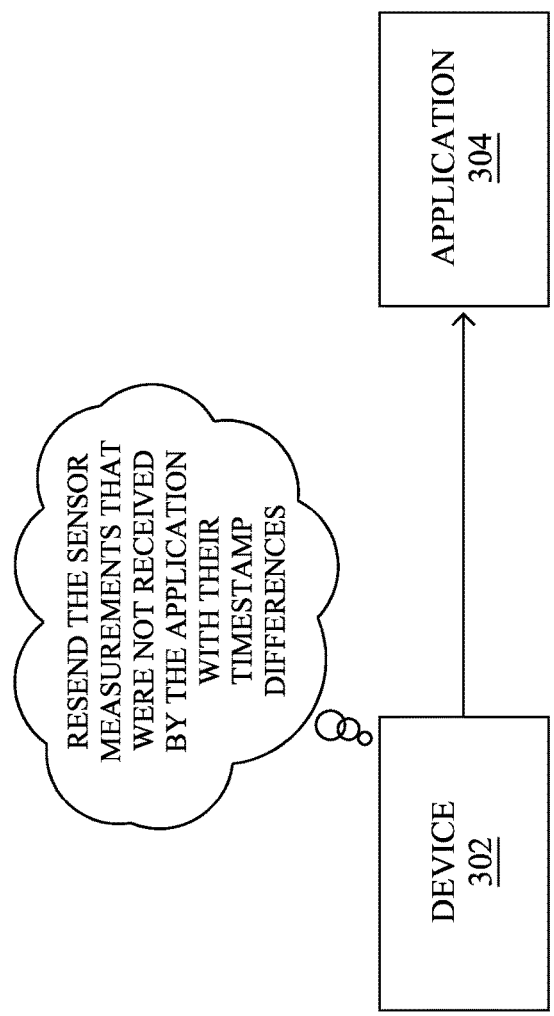

As illustrated in FIG. 3D, device 302 may resend the sensor measurements that were not initially received by application 304 prior to the query. Device 302 may resend each of the sensor measurements to application 304 along with their corresponding timestamp difference. For example, a particular sensor measurement that was previously sent to, but not received by, application 304 may be resent to application 304 with the timestamp difference determined for that particular sensor measurement included in the uplink payload.

Application 304 may receive any resent sensor measurements and their respective timestamp differences. Application 304, as described above, may have a concept of a standardized time value provided by a time source (e.g., an integrated or communicatively coupled clock, integrated or communicatively coupled time-keeping hardware and/or software, time value syncing via NTP or some other time-sync protocol) that is synchronized to a time standard. Application 304 may derive a standardized time-of-collection of each sensor measurement using its corresponding timestamp difference. Unlike the time-of-collection timestamp assigned to the sensor measurement by device 302, the standardized time-of-collection derived by application 304 may be a time value that is synchronized to a time standard. For example, application 304 may translate the timestamp difference into a standardized time value related to the time standard to which the application's time source is synchronized.

In various embodiments, when application 304 receives a resent sensor measurement and its timestamp difference, application 304 may derive the standardized time-of-collection for that sensor measurement by subtracting the timestamp difference from the time value indicated by the application 304's time source at the time the sensor measurement and its timestamp difference are received. For example, application 304 may reference the current time value of its time source (synchronized to a time standard) when it receives a sensor measurement to determine, in terms of the time standard to which it is synchronized, the time-of-receipt of the sensor measurement. Application 304 may then subtract the length of time specified in the timestamp difference (e.g., unsynchronized to a time standard) from the time value of its time source at time-of-receipt in order to determine the standardized time-of-collection for the sensor measurement. Application 304 may associate the determined standardized time-of-collection to the sensor measurement.

To provide a simplified example, device 302 may associate a time-of-collection timestamp of a sensor measurement as a fourth pulse of a time source of device 302 where the time source pulses every second. Then, the device 302 may receive an indication from application 304 that it did not receive that sensor measurement. Device 302 may determine at the time it is resending that sensor measurement that it is the thirty-fourth pulse of the time source of device 302 at that time and that the corresponding timestamp difference for the sensor measurement is thirty pulses or thirty seconds. Application 304 may receive the resent sensor measurement along with the timestamp difference of thirty seconds. Application 304 may reference its own time source to determine that the time-of-receipt of the sensor measurement and timestamp difference is 4:56:45 PM EST. Application 304 may then subtract the timestamp difference of thirty seconds from the time-of-receipt to determine a standardized time-of-collection of 4:56:45 PM EST-30 seconds=4:56:15 PM EST for the sensor measurement. The standardized time-of-collection of 4:56:15 PM EST may be associated to the sensor measurement.

Application 304 may respond to device 302 with an acknowledgement that the resent sensor measurements were received. Device 302 may, in response to the acknowledgment, removed the received sensor measurements and their associated timestamps from the buffer. Alternatively, as may be the case with originally sent sensor measurement as well, if device 302 receives no response from application 304, it may keep going about its normal operations (e.g., reporting messages on periodic intervals, even if those messages aren't "heard" by application 304 due to lack of coverage) and keep the sensor measurements and their time-of-collection timestamps in the buffer until a receipt acknowledgement is received for those measurements from application 304. In some instances, device 302 may need to repeat the process of retrieving the sensor measurement and its unstandardized time-of-collection timestamp from the buffer and determining a new timestamp difference value to resend once again until an acknowledgement is received.

Figure 4A:
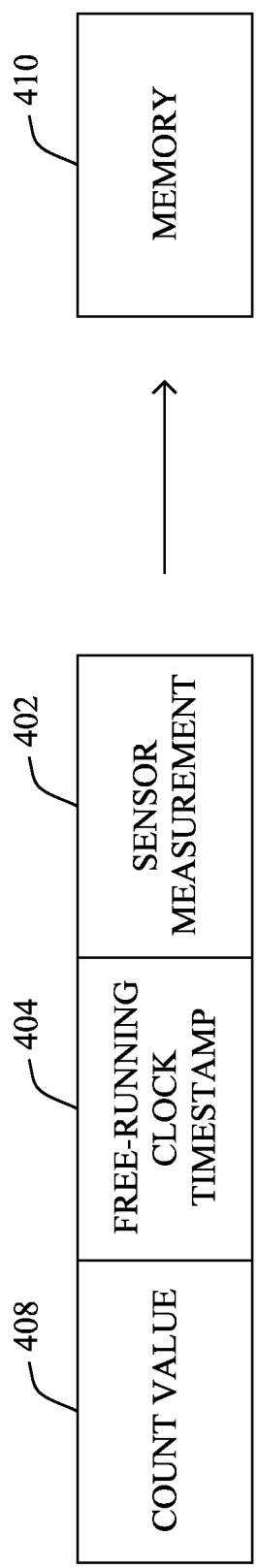
FIG. 4A-4B illustrate examples of sensor measurement data associations utilizable in a timestamping process.
Figure 4B:
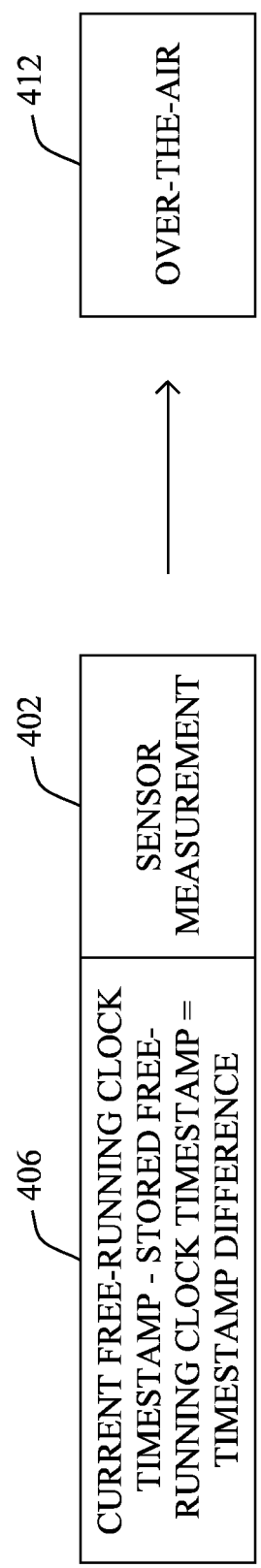

FIG. 4A-4B illustrate examples of sensor measurement data associations utilizable in a timestamping process, in accordance with one or more embodiments described herein. The data associations may be stored, communicated, and/or utilized in order to determine a standardized time of a sensor measurement collected by a device that does not have access and/or synchronization to standardized time information.

FIG. 4A illustrates a first sensor measurement data association. The sensor measurement data association may include the sensor measurement 402 itself. The sensor measurement 402 may include data collected by a sensor. The sensor measurement 402 may be collected without any access and/or synchronization to standardized time information.

Instead, a free-running clock timestamp 404 may be collected and/or associated to the sensor measurement 402 at the time that sensor measurement 402 is collected. The free-running clock timestamp 404 may de derived from a free-running clock of the sensor that is not synchronized to any standardized time information (e.g., not synchronized according to a network standard, absolute time, standard time, a manner of telling time that is shared with other devices via synchronization to a standard, a geographically defined time standard, a meridian-based time standard, a 24-hour clock time standard, synchronized to a calendar time standard, etc.). Free-running clock timestamp 404 may be expressed in seconds, minutes, hours, etc. that are not related to a standardized time.

In addition, a count value 408 may be associated to sensor measurement 402. Count value 408 may be a count value that was assigned to and/or included with a data frame, including the sensor measurement 402, that was communicated to an application.

The count value 408, the free-running clock timestamp 404, and/or the sensor measurement 402 may be stored in association with one another in memory 410. Memory 410 may be a buffer of the sensor that collected the sensor measurement 402.

FIG. 4B illustrates a second sensor measurement data association. The association again includes sensor measurement 402. After storing the count value 408, the free-running clock timestamp 404, and/or the sensor measurement 402 in memory 410, the application to which the sensor measurement 402 was sent may inform the sensor (e.g., using a single LoRaWAN downlink) that the sensor measurement 402 was not received. For example, the application may notify the sensor of a range of count values that it has not received and one of those count values may be count value 408 corresponding to sensor measurement 402.

Using the missing count value range information, the sensor may pull the count value 408, the free-running clock timestamp 404, and/or the sensor measurement 402 from memory 410. The sensor may utilize these retrieved values to prepare the sensor measurement 402 for retransmission via wireless uplink to the application.

The sensor may create the second data association (e.g., as a data frame) for transmission to the application. The second association may include sensor measurement 402. In addition, the sensor may associate timestamp difference 406 to sensor measurement 402 and include it in the data frame. Timestamp difference 406 may be determined by subtracting the free-running clock timestamp 404 from a current value of the free-running clock timestamp at the time of transmission of the frame. In some examples, the length of this "timestamp difference" field can be truncated as appropriate (e.g., milliseconds may be removed since there is no need to record down to the millisecond level for a sensor which only reports every 4 hours, etc.).

The frame including the sensor measurement 402 and the timestamp difference 406 may be sent (e.g., over-the-air 412) to an application via a wireless uplink. In some examples, the data frame may be sent on a different port (e.g., a different LoRaWAN port) so that it may be identified as a buffered uplink and acted upon appropriately by the application layer.

The application may receive the frame and combine it with its knowledge of a standardized time value to derive the standardized time at which the sensor measurement was taken by the sensor. In some examples, this standardized time-of-capture for the sensor measurement may be derived by subtracting the timestamp difference 406 (e.g., the length of time specified in the timestamp difference portion of the frame) from a current value of a time-source synchronized to a standardized time value. For example, the application may subtract the timestamp difference 406 from an indication of standardized time value (e.g., from an RTC, NTP, etc.) at the time the frame is received and/or processed.

Figure 5:
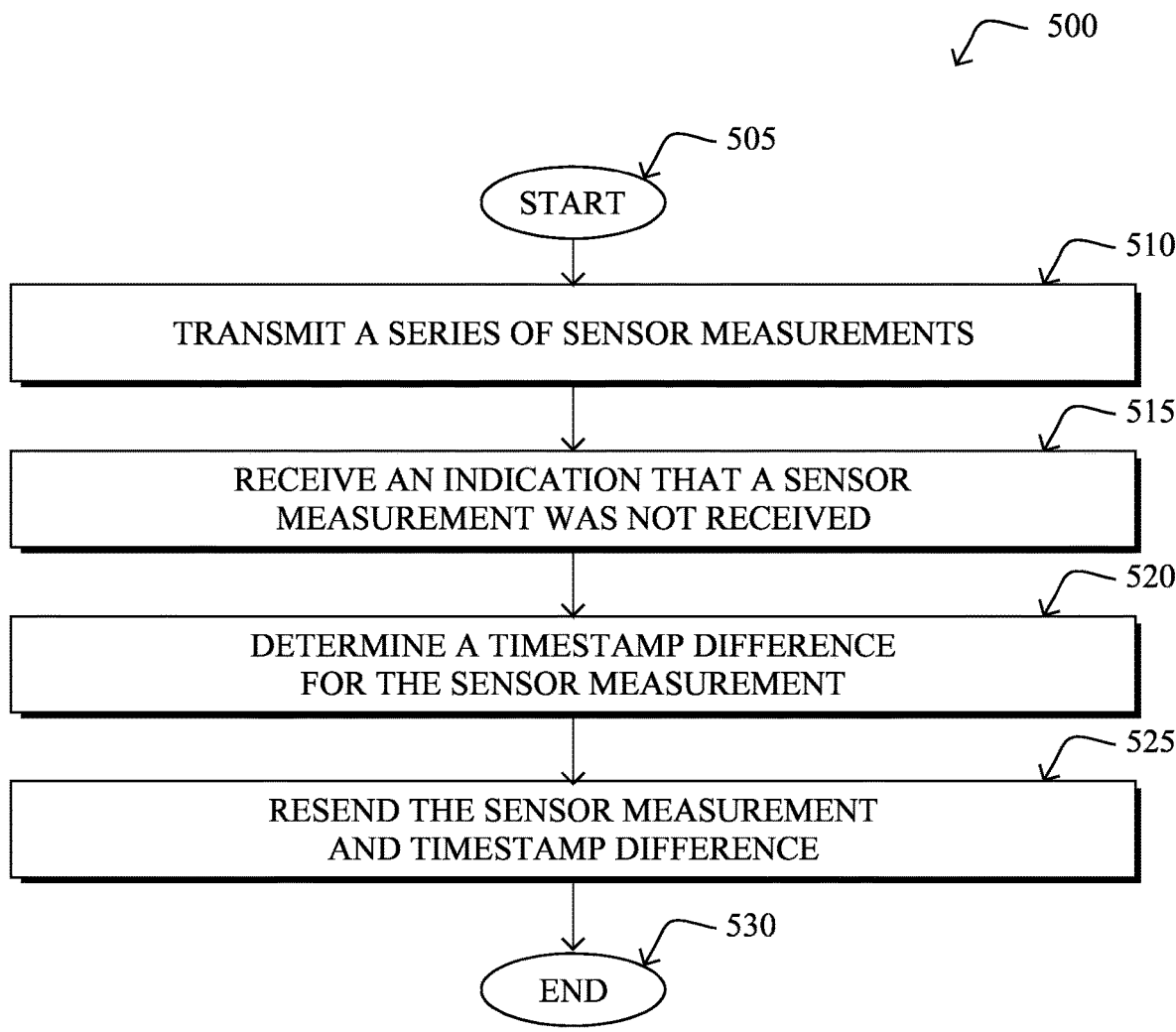
FIG. 5 illustrates an example simplified procedure utilizing sensor measurement timestamp differences.

FIG. 5 illustrates an example simplified procedure (e.g., a method) for utilizing sensor measurement timestamp differences, in accordance with one or more embodiments described herein. For example, a non-generic, specifically configured device (e.g., device 200), may perform procedure 500 by executing stored instructions (e.g., timestamping process 248). The procedure 500 may start at step 505, and continues to step 510, where, as described in greater detail above, a device may transmit, via a network and to an application, a series of sensor measurements captured by the device, each sensor measurement having an associated timestamp based on a clock of the device. The clock of the device may not be synchronized utilizing a network time synchronization protocol. The series of sensor measurements may be captured by one or more sensors of the device. The network may be a LoRaWAN network.

The device may insert count values associated with each sensor measurement when transmitting the series of sensor measurements captured by the device. The device may be configured to repeatedly transmit new sensor measurements to the application regardless of whether an acknowledgment of receipt is received from the application.

At step 515, as detailed above, the device may receive, from the application, an indication that at least a portion of the series of sensor measurement were not received by the application. The application may be configured to determine that the portion of the series of sensor measurement were not received based on the count values.

At step 520, as detailed above, the device may determine, for those sensor measurements not received by the application, timestamp differences between their timestamps and a current time of the clock of the device, after receiving the indication.

At step 525, where, as detailed above, the device may resend the portion of the series of sensor measurements to the application and their timestamp differences. The portion of the series of sensor measurements to resend to the application may be selected by the device from a buffer of the device. The buffer may include past sensor measurements and their associated timestamps. Past sensor measurements may be removed from a buffer of the device based on an acknowledgement from the application that the application has received the past sensor measurements.

The application reviewing the sensor measurements and their timestamp differences may be configured to subtract a timestamp difference determined for a sensor measurement of the portion of the series of sensor measurements from a timestamp based on a clock of the application to associate a new timestamp to the sensor measurement.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for accurately identifying a time-of-collection of sensor measurements regardless of when they are sent or resent and without necessitating additional dedicated hardware, software, and/or bandwidth consumption. This mechanism allows a sensor to operate without the burden of knowing a standardized time value and/or to what time standard an application it is sending its data to is synchronized. A sensor, therefore, does not need to utilize additional hardware, software, network bandwidth, etc. to achieve and/or maintain synchronization to a time standard. Instead, the sensor may rely on and/or repurpose existing integrated free-running clocking mechanisms to measure time passage and identify an unsynchronized time-of collection that can be sent to and/or incorporated for use by any application regardless of which standardized time the application is synchronized to. Further, the mechanism removes any urgency to the process of resending buffered sensor measurements. Especially in areas that constrain device communications with duty cycle requirements, it is unlikely that all buffered data could be sent at once. However, utilizing this mechanism, the buffered sensor measurements can be sent at any time (and even sent multiple times) since all of the data needed to determine the timestamp difference is already buffered.

While there have been shown and described illustrative embodiments that provide mechanism for utilizing sensor measurement timestamp differences, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   transmitting, by a device and via a LoRaWAN network to an application, a series of sensor measurements captured by the device, each sensor measurement having an associated timestamp based on a clock of the device;
   receiving, at the device and from the application, an indication that at least a portion of the series of sensor measurement were not received by the application;
   determining, by the device and for those sensor measurements not received by the application, timestamp differences between timestamps for those sensor measurements not received by the application and a current time of the clock of the device, after receiving the indication; and
   resending, by the device, the portion of the series of sensor measurements to the application and the timestamp differences.

2. The method as in claim 1, further comprising:
   capturing, by one or more sensors of the device, the series of sensor measurements.

3. The method as in claim 1, wherein resending the portion of the series of sensor measurements to the application further comprises:
   selecting, by the device, the portion of the series of sensor measurements to resend to the application from a buffer of the device including past sensor measurements and their associated timestamps.

4. The method as in claim 1, further comprising:
   removing past sensor measurements from a buffer of the device based on an acknowledgement from the application that the application has received the past sensor measurements.

5. The method as in claim 1, wherein the application is configured to subtract a timestamp difference determined for a sensor measurement of the portion of the series of sensor measurements from a timestamp based on a clock of the application to associate a new timestamp to the sensor measurement.

6. The method as in claim 1, further comprising:
inserting, by the device, count values associated with each sensor measurement when transmitting the series of sensor measurements captured by the device.

7. The method as in claim 6, wherein the application is configured to determine that the portion of the series of sensor measurement were not received based on the count values.

8. The method as in claim 1, wherein the clock of the device is not synchronized utilizing a network time synchronization protocol.

9. The method as in claim 1, further comprising:
repeatedly transmitting, by the device, new sensor measurements to the application regardless of whether an acknowledgment of receipt is received from the application.

10. An apparatus, comprising:
one or more network interfaces;
a processor coupled to the one or more network interfaces and configured to execute one or more processes; and
a memory configured to store a process that is executable by the processor, the process when executed configured to:
transmit, via a LoRaWAN network to an application, a series of sensor measurements captured by the apparatus, each sensor measurement having an associated timestamp based on a clock of the apparatus;
receive, from the application, an indication that at least a portion of the series of sensor measurement were not received by the application;
determine, for those sensor measurements not received by the application, timestamp differences between timestamps for those sensor measurements not received by the application and a current time of the clock of the apparatus, after receiving the indication; and
resend the portion of the series of sensor measurements to the application and their timestamp differences.

11. The apparatus as in claim 10, wherein the process when executed is further configured to:
capture, by one or more sensors of the apparatus, the series of sensor measurements.

12. The apparatus as in claim 10, wherein the process when executed is further configured to:
select the portion of the series of sensor measurements to resend to the application from a buffer of the apparatus including past sensor measurements and their associated timestamps.

13. The apparatus as in claim 12, wherein the process when executed is further configured to:
remove past sensor measurements from a buffer of the apparatus based on an acknowledgement from the application that the application has received the past sensor measurements.

14. The apparatus as in claim 10, wherein the application is configured to subtract a time stamp difference determined for a sensor measurement of the portion of the series of sensor measurements from a timestamp based on a clock of the application to associate a new timestamp to the sensor measurement.

15. The apparatus as in claim 10, wherein the process when executed is further configured to:
insert count values associated with each sensor measurement when transmitting the series of sensor measurements captured by the apparatus.

16. The apparatus as in claim 15, wherein the application is configured to determine that the portion of the series of sensor measurement were not received based on their associated count values.

17. The apparatus as in claim 10, wherein the clock of the apparatus is not synchronized utilizing a network time synchronization protocol.

18. The apparatus as in claim 10, wherein the process when executed is further configured to:
repeatedly transmit new sensor measurements to the application regardless of whether an acknowledgment of receipt is received from the application.

19. A tangible, non-transitory, computer-readable medium storing program instructions that cause a device to execute a process comprising:
transmitting, by the device and via a LoRaWAN network to an application, a series of sensor measurements captured by the device, each sensor measurement having an associated timestamp based on a clock of the device;
receiving, at the device and from the application, an indication that at least a portion of the series of sensor measurement were not received by the application;
determining, by the device and for those sensor measurements not received by the application, timestamp differences between timestamps for those sensor measurements not received by the application and a current time of the clock of the device, after receiving the indication; and
resending, by the device, the portion of the series of sensor measurements to the application and their timestamp differences.

* * * * *